United States Patent [19]
Weber et al.

[11] 3,760,074
[45] Sept. 18, 1973

[54] PHARMACEUTICAL COMPOSITIONS CONTAINING A 5-PHENYL-7-BROMO-1H-1,5-BENZODIAZEPINE-2,4-(3H,5H)-DIONE

[75] Inventors: Karl Heinz Weber, Gau-Algesheim; Karl Zeile; Peter Dannesberg, both of Ingelheim am Rhine; Rolf Giesemann, Bingen, all of Germany; Karl Heinz Hauptmann, deceased, late of Ingelheim am Rhine, Germany by Maria Hauptmann, heir

[73] Assignee: Boehringer Ingelheim GmbH, Rhine, Germany

[22] Filed: Sept. 27, 1972

[21] Appl. No.: 292,748

Related U.S. Application Data

[60] Division of Ser. No. 111,714, Feb. 1, 1971, Pat. No. 3,711,470, which is a continuation-in-part of Ser. No. 89,482, Nov. 13, 1970, abandoned, which is a continuation of Ser. No. 703,188, Feb. 5, 1968, abandoned.

[30] Foreign Application Priority Data

| Feb. 7, 1967 | Germany | B 91,071 |
| Jan. 18, 1968 | Germany | B 96,281 |
| Jan. 18, 1968 | Germany | B 96,282 |

[52] U.S. Cl. .............................. 424/244
[51] Int. Cl. ............................. A61k 27/00
[58] Field of Search .................... 424/244

[56] References Cited
OTHER PUBLICATIONS

Yale, J. Med. Pharm. Chem., Vol. 1, pp. 121–133 (1959).

Buche et al., Helv. Chem. Acta, 39, pp. 957–965 (1956).

Primary Examiner—Stanley J. Friedman
Attorney—Nelson Littell et al.

[57] ABSTRACT

Psychosedative and anticonvulsive pharmaceutical compositions containing as an active ingredient a compound of the formula

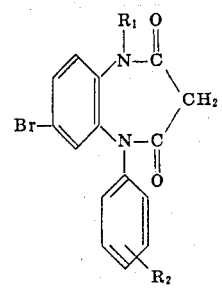

wherein
$R_1$ is hydrogen, methyl, ethyl, hydroxy-ethyl or (cycloalkyl of 3 to 6 carbon atoms)-methyl, and
$R_2$ is hydrogen or halogen;

and a method of tranquilizing and suppressing convulsions in warm-blooded animals therewith.

3 Claims, No Drawings

PHARMACEUTICAL COMPOSITIONS CONTAINING A 5-PHENYL-7-BROMO-1H-1,5-BENZODIAZEPINE-2,4-(3H,5H)-DIONE

This is a division of copending application Ser. No. 111,714 filed Feb. 1, 1971 now U.S. Pat. No. 3,711,470, which in turn is a continuation-in-part of copending application Ser. No. 89,482 filed Nov. 13, 1970, now abandoned, which in turn is a continuation of application Ser. No. 703,188 filed Feb. 5, 1968, now abandoned.

This invention relates to novel pharmaceutical compositions containing a 5-phenyl-7-bromo-1H-1,5-benzodiazepine-2,4-(3H,5H)-dione as an active ingredient, as well as to a novel method of tranquilizing and suppressing convulsions in warm-blooded animals therewith.

More particularly, the present invention relates to pharmaceutical compositions containing as an active ingredient a compound of the formula

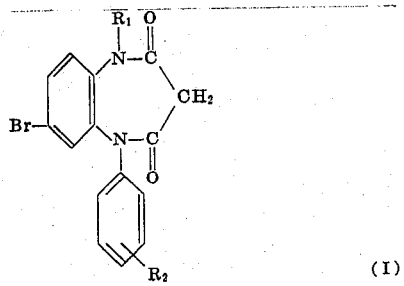

(I)

wherein
$R_1$ is hydrogen, methyl, ethyl, hydroxy-ethyl or (cycloalkyl of 3 to 6 carbon atoms)-methyl, and
$R_2$ is hydrogen or halogen.

The compounds embraced by formula I may be prepared by a number of different methods involving well known chemical principles, among which the following have proved to be particularly convenient and efficient:

Method A

By cyclizing an N-phenyl-N-(2-amino-5-bromophenyl)-malonic acid lower alkyl ester amide of the formula

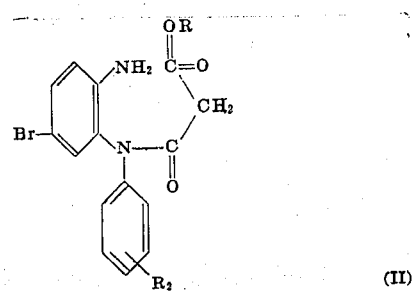

(II)

wherein R is lower alkyl and $R_2$ has the same meanings as in formula I, and, if desired, subsequently alkylating the cyclization product in the 1-position.

Method B

By cyclizing a 2-amino-5-bromo-diphenyl-amine of the formula

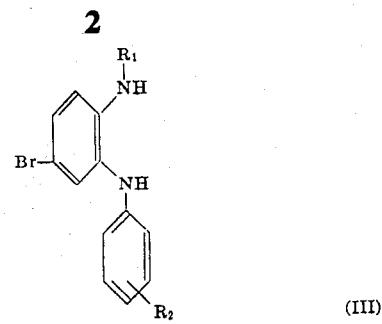

(III)

wherein $R_1$ and $R_2$ have the same meanings as in formula I, with a malonic acid or alkylmalonic acid dihalide and, if desired, alkylating the cyclization product thus obtained in the 1-position.

In method A the hydrolysis and ring closure proceed smoothly and with good yields in an acid as well as an alkaline medium, preferably in the presence of an alcoholic or aqueous alcoholic solvent; however, other inert solvents such as tetrahydrofuran or dioxan, are also suitable; for acid cyclization, acetonitrile may also be used as the solvent. Mineral acids, and particularly hydrohalic acids, such as hydrochloric acid, hydrobromic acid, hydroiodic acid, sulfuric acid, phosphoric acid and perchloric acid are preferably used as acid cyclization agents. Examples of alkaline cyclization agents are sodium alcoholates and alkali metal hydroxides.

The reaction periods depend upon the quantity of acid or alkali employed and upon the type of solvent used; they vary between several hours and several days. The preferred reaction temperatures are preferably between +20°C. and the boiling point of the solvent which is used.

The preparation of an end product of the formula I, wherein $R_1$ is unsubstituted or hydroxy-substituted alkyl, may be carried out in various ways. One may, for instance, start from a compound of the formula I wherein $R_1$ is hydrogen and exchange the same for an alkyl group with the aid of a customary alkylating agent, such as an alkyl halide or an alkyl sulfate, such as a dialkylsulfate. For this purpose an alkali metal salt of a compound of formula I is dissolved or suspended in a suitable solvent, the alkylating agent is added to the solution or suspension, and the reaction mixture is heated. For the preparation of an end product of the formula I wherein $R_1$ is hydroxyalkyl, a compound of formula I wherein $R_1$ is hydrogen may be reacted with an alkyleneoxide in the presence of a strong base, such as Triton-B. If the cyclization is carried out under alkaline conditions, the alkylation of the 1-position may also be effected after the cyclization is finished, without prior isolation of the 1-unsubstituted benzodiazepine-2,4-dione cyclization product. In this case the alkylating agent is added to the cyclization reaction solution containing the cyclization product, and the mixture heated.

In method B the reaction is preferably carried out in the presence of a suitable inert organic solvent, such as benzene, toluene, xylene, tetrahydrofuran, dioxan or dimethylformamide, at room temperature or, more advantageously, at the boiling point of the particular solvent which is used. In some cases the addition of a tertiary organic base, such as pyridine, has proved to have a favorable influence upon the course of the reaction. An end product of the formula I, wherein $R_1$ is hydrogen, may optionally be subsequently alkylated, as described in conjunction with method A.

The N-phenyl-N-(2-amino-5-bromo-phenyl)-malonic acid lower alkyl ester amides of the formula II used as starting materials for method A are also novel. They may be prepared by reacting a correspondingly substituted N-phenyl-N-(2-nitro-5-bromo-phenyl)-amine with a malonic acid monoalkyl ester halide to obtain an N-phenyl-N-(2-nitro-5-bromo-phenyl)-malonic acid alkyl ester amide, and subsequently reducing the nitro group according to the following reaction sequence:

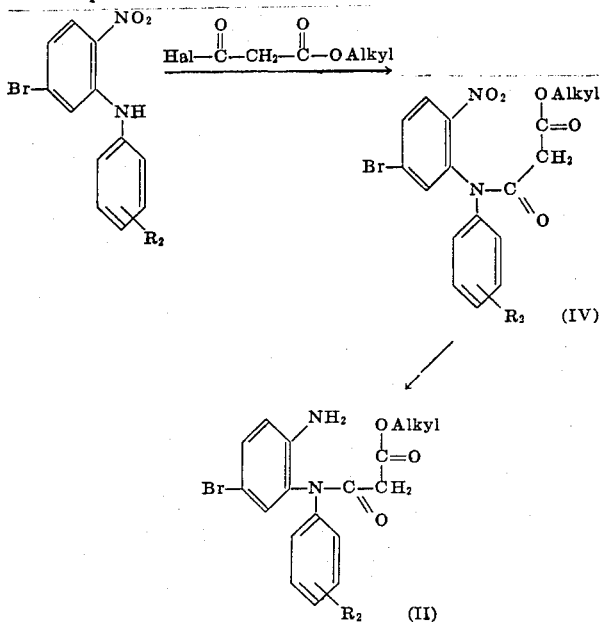

wherein R₂ has the same meanings as in formula I.

Thus, the preparation of an N-phenyl-N-(2-nitro-5-bromo-phenyl)-malonic acid alkyl ester amide of the formula IV is carried out, for example, by heating a solution of N-phenyl-N-(2-nitro-5-bromo-phenyl)-amine in a suitable solvent, such as benzene, toluene or xylene, with a malonic acid alkyl ester halide, whereby the nitro compound IV is always obtained with good yields (80 percent) and in the crystalline form.

The subsequent reduction of compound IV may be effected by nascent or catalytic hydrogenation, for example, by hydrogenation with Raney-nickel or with a mixture of iron and glacial acetic acid.

For the cyclization to form the 5-phenyl-7-bromo-1H-1,5-benzodiazepine-2,4-dione end product of the formula I it is not absolutely necessary to start from an isolated compound of the formula II; instead, the solution containing the hydrogenated intermediate product II may directly be treated with the cyclization agents mentioned above, after removal of the catalyst.

The starting compounds of the formula III wherein R₁ is hydrogen may be prepared by conventional methods, for example, by catalytic reduction of the corresponding 2-nitro-diphenylamine. Starting compounds of the formula III wherein R₁ is alkyl may be obtained analogous to the method described in Chem. Berichte, Volume 34, page 4204 (1902), and Volume 37, page 552 (1904), that is, by cyclizing a 2-aminodiphenylamine with formic acid, alkylating at the nitrogen atom in the cyclization product by means of an alkyl iodide, and subsequently splitting the ring with an alkali.

The following examples illustrate the preparation of compounds of the formula I:

EXAMPLE 1

5-Phenyl-7-bromo-1H-1,5-benzodiazepine-2,4-(3H,5H)-dione by method A 25 gm of the N-phenyl-N-(2-amino-5-bromo-phenyl)-amide of ethyl malonate (m. p. 117°–118°C.) were added at room temperature to an ethanolic sodium ethylate solution prepared from 300 ml of absolute ethanol and 2.5 gm of sodium. The resulting solution was allowed to stand at room temperature for 8 hours. The sodium salt of the malonic acid amide formed thereby precipitated out and was collected by vacuum filtration and dissolved in water. The resulting aqueous solution was acidified with concentrated hydrochloric acid, and the precipitate formed thereby was collected. 18 gm (80 percent of theory) of 5-phenyl-7-bromo-1H-1,5-benzodiazepine-2,4-(3H,5H)-dione, m. p. 302°–304°C., of the formula

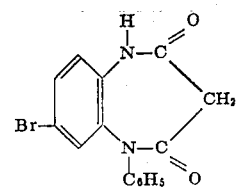

were obtained.

The starting compound was obtained in the following manner:

60 gm of N-phenyl-N-(2-nitro-5-bromo-phenyl)-amine and 37 gm of malonic acid ethyl ester chloride were dissolved in 500 ml of benzene, and the solution was refluxed for 18 hours. Thereafter, the reaction solution was washed with aqueous sodium bicarbonate and with water, and the benzene was then substantially evaporated in vacuo. Upon addition of ethanol to the residue, 53 gm of the N-phenyl-N-(2-nitro-5-bromo-phenyl)-amide of ethyl malonate, m. p. 93°–96°C., crystallized out. 52 gm of this product were dissolved in methanol, and the solution was hydrogenated at 6 atmospheres gauge at room temperature in the presence of Raney nickel, until the calculated amount of hydrogen had been absorbed. Thereafter, the catalyst was filtered off, the methanol was distilled out of the filtrate, and the residue was crystallized from a small amount of methanol. 30 gm of the N-phenyl-N-(2-amino-5-bromo-phenyl)-amide of ethyl malonate, m. p. 117°–118°C., were obtained.

EXAMPLE 2

Using a procedure analogous to that described in Example 1, 1-methyl-5-phenyl-7-bromo-1H-1,5-benzodiazepine-2,4-(3H,5H)-dione, m. p. 202°–204°C., of the formula

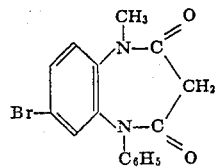

was prepared from the N-phenyl-N-(2-amino-5-bromo-phenyl)-amide of ethyl malonate and subsequent methylation.

EXAMPLE 3

Using a procedure analogous to that described in Example 1, 1-ethyl-5-phenyl-7-bromo-1H,-1,5-benzodiazepine-2,4-(3H,5H)-dione, m. p. 201°–203°C., of the formula

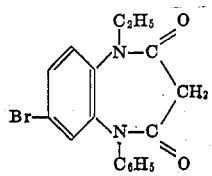

was prepared from the N-phenyl-N-(2-amino-5-bromo-phenyl)-amide of ethyl malonate and subsequent ethylation.

EXAMPLE 4

Using a procedure analogous to that described in Example 1, 1-methyl-5-(o-bromo-phenyl)-7-bromo-1H-1,5-benzodiazepine-2,4-(3H,5H)-dione, m. p. 205°–208°C., of the formula

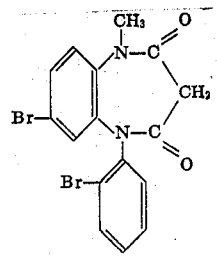

was prepared from the N-(o-bromo-phenyl)-N-(2-amino-5-bromo-phenyl)-amide of ethyl malonate and subsequent methylation.

EXAMPLE 5

Using a procedure analogous to that described in Example 1, 1-methyl-5-(o-fluoro-phenyl)-7-bromo-1H-1,5-benzodiazepine-2,4-(3H,5H)-dione, m. p. 179°–181°C., of the formula

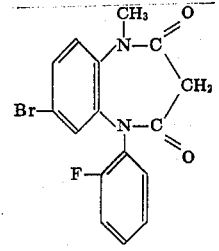

was prepared from the N-(o-fluoro-phenyl)-N-(2-amino-5-bromo-phenyl)-amide of ethyl malonate and subsequent methyl-ation.

EXAMPLE 6

Using a procedure analogous to that described in Example 1, 1-methyl-5-(o-chloro-phenyl)-7-bromo-1H-1,5-benzodiazepine- 2,4-(3H,5H)-dione, m. p. 210°–212°C., of the formula

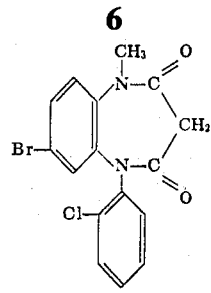

was prepared from the N-(o-chloro-phenyl)-N-(2-amino-5-bromo-phenyl)-amide of ethyl malonate and subsequent methylation.

EXAMPLE 7

Using a procedure analogous to that described in Example 1, 1-ethyl-5-(o-fluoro-phenyl)-7-bromo-1H-1,5-benzodiazepine-2,4-(3H,5H)-dione, m. p. 226°–228°C., of the formula

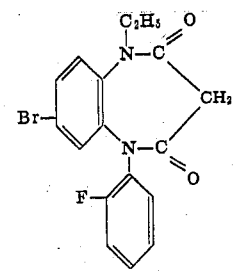

was prepared from the N-(o-fluoro-phenyl)-N-(2-amino-5-bromophenyl)-amide of ethyl malonate and subsequent ethylation.

EXAMPLE 8

Using a procedure analogous to that described in Example 1, 1-(β-hydroxy-ethyl)-5-phenyl-7-bromo-1H-1,5-benzodiazepine-2,4-(3H,5H)-dione, m. p. 203°–206°C., of the formula

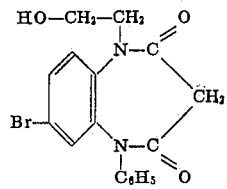

was prepared from the N-phenyl-N-(2-amino-5-bromo-phenyl)-amide of ethyl malonate and subsequent reaction with ethylene oxide.

EXAMPLE 9

Using a procedure analogous to that described in Example 1, 1-(cyclopropyl-methyl)-5-phenyl-7-bromo-1H-1,5-benzodiazepine-2,4-(3H,5H)-dione, m. p. 205°C., of the formula

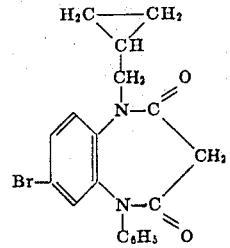

was prepared from the N-phenyl-N-(2-methylamino-5-bromophenyl)-amide of ethyl malonate and subsequent alkylation with cyclopropylbromide.

The compounds embraced by formula I have useful pharmacodynamic properties. More particularly, they exhibit very effective psychosedative (tranquilizing) and anticonvulsive activities in warm-blooded animals, such as mice, rats and dogs, coupled with low toxicity.

Particularly effective are compounds of the formula I wherein $R_1$ is hydrogen, methyl or ethyl, and $R_2$ is hydrogen or fluorine, and especially 1-ethyl-5-phenyl-7-bromo-1H-1,5-benzodiazepine-2,4-(3H,5H)-dione and 1-ethyl-5-(o-fluoro-phenyl)-7-bromo-1H-1,5-benzodiazepine-2,4-(3H,5H)-dione.

The tranquilizing activity of the 7-bromo-compounds of the formula I and that of the analogous 7-chloro-compounds was ascertained by means of the standard pharmacological test method of J. R. Boissier, Therapie 19, 571–589 (1964).

Briefly summarized, the test apparatus consists of a square sheet of plywood, 40 × 40 cm, having a leg a few centimeters high at each corner; 16 regularly spaced circular holes, each 3 cm in diameter, are drilled into the plywood. The raised, perforated sheet of plywood is placed on a horizontal surface and illuminated from above by a source of light. An untreated laboratory mouse is placed into the space between the plywood sheet and the supporting surface; following its natural curiosity or exploration drive, the mouse investigates or explores a given number of lighted holes over a given period of time. The number of holes investigated by the mouse over that period of time is recorded and used as a control value. The compound under investigation for tranquilizing activity is then administered to the mouse, the treated animal is again placed under the sheet of perforated plywood, and the number of investigated holes over the same period as in the control test is recorded. If the compound under investigation has tranquilizing properties, a linear decrease in the curiosity or exploration drive of the treated animal is observed which manifests itself in a proportionate reduction in the number of holes investigated by the animal, depending upon the dosage level and degree of tranquilizing action.

The compounds in the instant case were administered to the test mice perorally in the form of an oil-emulsion. Each compound was tested at four different dosage levels, using five mice per dose. The control values were also obtained from five untreated mice.

From the raw data thus obtained, the dose was calculated for each compound which reduces the exploration drive by 50 percent over the control animals ($ED_{50}$).

The following table shows the results obtained, as well as the median lethal dose ($LD_{50}$) and the therapeutic index ($LD_{50}/ED_{50}$) for each compound tested:

TABLE

| Compound | $ED_{50}$ mgm/kg | $LD_{50}$ mgm/kg | $LD_{50}/ED_{50}$ |
| --- | --- | --- | --- |
| 7-Chloro-5-phenyl-1H-1,5-benzodiazepine-2,4-(3H,5H)-dione | 250 | >2583 | >10.3 |
| 7-Bromo-5-phenyl-1H-1,5-benzodiazepine-2,4-(3H,5H)-dione | 34 | >3069 | >90.2 |
| 7-Chloro-1-methyl-5-phenyl-1H-1,5-benzodiazepine-2,4-(3H,5H)-dione | 35 | 825 | 23.6 |
| 7-Bromo-1-methyl-5-phenyl-1H-1,5-benzodiazepine-2,4-(3H,5H)-dione | 15.8 | 1850 | 117 |
| 7-Chloro-1-ethyl-5-phenyl-1H-1,5-benzodiazepine-2,4-(3H,5H)-dione | 39 | >2826 | >72.5 |
| 7-Bromo-1-ethyl-5-phenyl-1H-1,5-benzodiazepine-2,4-(3H,5H)-dione | 10.4 | >3321 | >311 |

These results clearly show that in each case the 7-bromo-compound is a significantly more effective tranquilizer and has a substantially greater therapeutic ratio than the corresponding 7-chloro-compound.

For pharmaceutical purposes the compounds of the formula I are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0166 to 0.833 mgm/kg body weight, preferably 0.0833 to 0.42 mgm/kg body weight, and the daily dose rate is from 0.166 to 2.5 mgm/kg body weight.

The following examples illustrate a few dosage unit compositions comprising a compound of the formula I as an active ingredient and represent the best mode contemplated of putting the present invention into practical use. The parts are parts by weight unless otherwise specified.

EXAMPLE 10

Coated Pills

The pill core composition was compounded from the following ingredients:

| | Parts |
| --- | --- |
| 1-Ethyl-5-phenyl-7-bromo-1H-1,5-benzodiazepine-2,4-(3H,5H)-dione | 10.0 |
| Lactose | 28.5 |
| Corn starch | 15.0 |
| Gelatin | 1.0 |
| Magnesium stearate | 0.5 |
| Total | 55.0 |

Compounding procedure:

The benzodiazepinedione compound was intimately admixed with the lactose and the corn starch, the mixture was moistened with an aqueous 10 percent solution of the gelatin, the moist mass was forced through a 1 mm-mesh screen, and the granulate obtained thereby was dried at 40°C. and again passed through the screen. The dry granulate was admixed with the magnesium stearate, and the mixture was pressed into 55 mgm-pill cores, which were subsequently coated with a thin shell with the aid of an aqueous suspension of sugar, talcum, titanium dioxide and gum arabic, and the coated pills were polished with beeswax. One coated pill contained 10 mgm of the benzodiazepinedione compound and, when administered to a warm-blooded animal of about 60 kg body weight in need of such treatment, produced very good tranquilizing and anticonvulsive effects.

EXAMPLE 11

Suppositories

The suppository composition was compounded from the following ingredients:

| | Parts |
|---|---|
| 1-Ethyl-5-(o-fluorophenyl)-7-bromo-1H-1,5-benzodiazepine-2,4-(3H,5H)-dione | 10.0 |
| Cocoa butter | 1690.0 |
| Total | 1700.0 |

Compounding procedure:

The finely powdered benzodiazepinedione compound was stirred, with the aid of an immersion homogenizer, into the cocoa butter which had previously been melted and cooled to about 40°C. The homogenous mixture was then cooled to 35°C. and was poured into cooled suppository molds, each holding 1,700 mgm of the mixture. One suppository contained 10 mgm of the benzodiazepinedione compound and, when administered by the rectal route to a warm-blooded animal of about 60 kg body weight in need of such treatment, produced very good tranquilizing and anticonvulsive effects.

Analgous results were obtained when any one of the other benzodiazepinediones embraced by formula I was substituted for the particular benzodiazepinedione in Examples 10 and 11. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will readily be apparent to others skilled in the art that the invention is not limited to these particular embodiments, and that various changes and modifications may be made without departing from the spirit of the invention or the scope of the appended claims.

We claim:

1. A pharmaceutical dosage unit composition consisting essentially of an inert pharmaceutical carrier and one effective tranquilizing and anticonvulsive amount of a compound of the formula

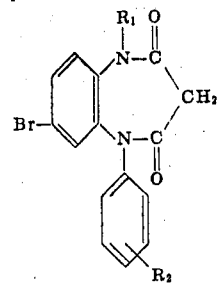

wherein
$R_1$ is hydrogen, methyl, ethyl, hydroxy-ethyl or (cycloalkyl of 3 to 6 carbon atoms)-methyl, and
$R_2$ is hydrogen or halogen.

2. The method of inducing psychosedation and suppressing convulsions in a warm-blooded animal in need of such treatment, which comprises administering to said animal an effective tranquilizing and anticonvulsive amount of a compound of the formula

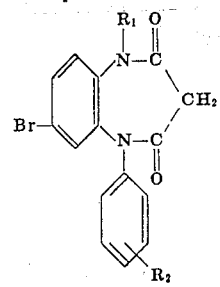

wherein
$R_1$ is hydrogen, methyl, ethyl, hydroxy-ethyl or (cycloalkyl of 3 to 6 carbon atoms)-methyl, and
$R_2$ is hydrogen or halogen.

3. The method according to claim 2, in which the effective tranquilizing and anticonvulsive amount of said compound is from 0.0166 to 0.833 mgm/kg body weight.

* * * * *

UNITED STATES PATENT OFFICE
CERTIFICATE OF CORRECTION

Patent No. 3,760,074          Dated September 18, 1973

Inventor(s) Karl Heinz Weber et al.

It is certified that error appears in the above-identified patent and that said Letters Patent are hereby corrected as shown below:

Column 1, second formula: the portion of the formula reading 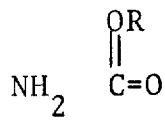 should read 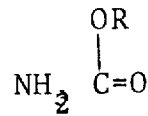

Column 8, line 10, "1H,5-benzo" should read -- 1H-1,5-benzo --.

Signed and sealed this 17th day of September 1974.

(SEAL)
Attest:

McCOY M. GIBSON JR.          C. MARSHALL DANN
Attesting Officer          Commissioner of Patents